United States Patent [19]

Hamaguchi et al.

[11] Patent Number: 5,069,697

[45] Date of Patent: Dec. 3, 1991

[54] POROUS CERAMIC HONEYCOMB FILTER AND METHOD OF PRODUCING THE SAME

[75] Inventors: Kunikazu Hamaguchi; Takashi Harada, both of Nagoya; Toshiyuki Hamanaka, Suzuka, all of Japan

[73] Assignee: NGK Insulators, Ltd., Aichi, Japan

[21] Appl. No.: 389,336

[22] Filed: Aug. 3, 1989

[30] Foreign Application Priority Data

Aug. 12, 1988 [JP] Japan ................. 63-201657

[51] Int. Cl.$^5$ ............. B01D 39/20; C04B 35/64
[52] U.S. Cl. ................. 55/523; 55/DIG. 30; 264/44
[58] Field of Search ........... 55/523; 264/43, 44

[56] References Cited

U.S. PATENT DOCUMENTS

| 4,191,720 | 3/1980 | Pasco et al. | 264/43 |
|---|---|---|---|
| 4,191,721 | 3/1980 | Pasco et al. | 264/43 |
| 4,264,346 | 4/1981 | Mann | 55/523 |
| 4,278,544 | 7/1981 | Takashima | 55/523 X |
| 4,283,210 | 8/1981 | Mochida et al. | 55/523 |
| 4,340,403 | 7/1982 | Higuchi et al. | 55/523 |
| 4,364,760 | 12/1982 | Higuchi et al. | 55/523 |
| 4,407,967 | 10/1983 | Luks | 264/43 X |
| 4,416,675 | 11/1983 | Montierth | 55/523 X |
| 4,417,908 | 11/1983 | Pitcher, Jr. | 55/523 |
| 4,419,108 | 12/1983 | Frost et al. | 55/523 X |
| 4,432,918 | 2/1984 | Paisley | 264/43 |
| 4,455,180 | 6/1984 | Hillman et al. | 55/523 X |
| 4,632,683 | 12/1986 | Fukutani et al. | 55/523 |
| 4,704,863 | 11/1987 | Abthoff et al. | 55/523 X |
| 4,732,593 | 3/1988 | Kondo et al. | 55/523 |
| 4,857,089 | 8/1989 | Kitagawa et al. | 55/523 |

FOREIGN PATENT DOCUMENTS

| 2617491 | 11/1976 | Fed. Rep. of Germany | 55/523 |
|---|---|---|---|
| 55-137022 | 10/1980 | Japan | 55/523 |
| 57-049009 | 3/1982 | Japan | 55/523 |
| 58-70814 | 4/1983 | Japan . | |
| 58-159828 | 9/1983 | Japan | 55/523 |
| 61-54750 | 11/1986 | Japan . | |
| 62-026312 | 2/1987 | Japan | 55/523 |

Primary Examiner—Robert Spitzer
Attorney, Agent, or Firm—Parkhurst, Wendel & Rossi

[57] ABSTRACT

A porous ceramic honeycomb filter having a chemical composition consisting of, as main components, 42–56 wt % $SiO_2$, 30–45 wt % $Al_2O_3$, and 12–16 wt % MgO and containing cordierite as a main component of a crystalline phase. The porous ceramic honeycomb filter has a porosity of at least 40% and not greater than 55%. The volume of pores having a diameter not larger than 2 $\mu$m in the filter is not larger than 0.015 cc/g to thereby improve the collecting time with low pressure loss and high collecting efficiency.

4 Claims, 3 Drawing Sheets

POROUS CERAMIC HONEYCOMB FILTER AND METHOD OF PRODUCING THE SAME

BACKGROUND OF THE INVENTION

1. Field of the Invention

The present invention relates to a porous ceramic honeycomb filter consisting of a cordierite ceramic. In particular, the invention relates to an improvement of properties of thermal shock resistance and particulate collecting time of the porous ceramic honeycomb filter for collecting particulates, e.g. soots contained in an exhaust gas from a diesel engine for automobiles, and a method of producing the same.

2. Related Art Statement

Recently, ceramic materials having high thermal resistance and thermal shock resistance have been used in various industrial fields with the advance of industrial technology. As an example, a diesel particulate filter having a honeycomb structure consisting of cordierite ceramic is used for collecting particulates contained in exhaust gas from the diesel engine for automobiles.

The diesel particulate filters may be classified broadly into a high collecting efficiency type for big automobiles and a low collecting efficiency type for small automobiles and are used properly corresponding to various purposes.

Japanese patent Application Publication No. 61-54750 is a prior art relating to a filtering performance of a porous honeycomb filter. The publication discloses that porous ceramic honeycomb filters of the high collecting efficiency type and the low collecting efficiency type can be designed by controlling an open porosity and an average diameter of pores. Furthermore, Japanese Patent Application Laid-open No. 58-70814 discloses that the pressure loss can be decreased by providing large pores having a diameter larger than 100 $\mu$m.

The porous ceramic honeycomb filter has three properties such as a particulate collecting efficiency, a pressure loss and a particulate collecting time as a filter. The particulate collecting efficiency and the pressure loss are in a relationship of an inverse proportion to each other, that is the higher the collecting efficiency, the greater the pressure loss and conversely the smaller the pressure loss the lower the collecting efficiency. The relationship varies depending on the kinds of engines to be applied.

The most important property of the filter is the particulate collecting time in which the filter can continuously effectively collect the particulates in the gas with a pressure loss not greater than a predetermined value. If the collecting time is short, an interval between regenerating treatments becomes short. Accordingly, there is a problem that the volume of the filter must of necessity be made large since the collecting time is short.

SUMMARY OF THE INVENTION

It is an object of the present invention to eliminate the above mentioned drawbacks, and to provide a porous ceramic honeycomb filter having a property of long collecting time independent of the high collecting efficiency type and the low collecting efficiency type. That is, the collecting time is greatly increased with the same collecting efficiency and pressure loss.

It is another object of the present invention to provide a method of producing such an improved porous ceramic honeycomb filter.

The porous ceramic honeycomb filter according to the present invention has a chemical composition consisting of, as main components, 42–56 wt% $SiO_2$, 30–45 wt% $Al_2O_3$, and 12–16 wt% MgO and contains cordierite as a main component of a crystalline phase, wherein the porous ceramic honeycomb filter has a porosity of at least 40% and not greater than 55%, and the volume of pores having a diameter not larger than 2 $\mu$m in the filter is not greater than 0.015 cc/g.

The method of producing the porous ceramic honeycomb filter according to the present invention comprises the steps of:

preparing a mixture by mixing a cordierite raw material having a chemical composition consisting of, as main components, 42–56 wt% $SiO_2$, 30–45 wt% $Al_2O_3$, and 12–16 wt% MgO with a pore forming agent;

adjusting the grain size of fine particles of the raw material such that particles having a diameter not larger than 2 $\mu$m are not more than 35 wt% of all of the raw material;

making a batch of mixture by adding a plasticizer and a binder to the adjusted raw material;

manufacturing a ceramic honeycomb filter by extrusion molding the plasticized batch; and drying and firing the dry ceramic honeycomb filter at a firing temperature in a range of 1350°–1440° C.

According to the present invention, the porous ceramic honeycomb filter has an open porosity of at least 40% and not greater than 55% and the volume of pores having a diameter of not larger than 2 $\mu$m is not greater than 0.015 cc/g so as to decrease fine pores to thereby prolong the collecting time, independent of the high collecting efficiency type and the low collecting efficiency type. The fine pores having a diameter not larger than 2 $\mu$m do not contribute to the particulate collecting efficiency and are clogged by the particulates to cause premature increase of the pressure loss.

The pores having a diameter larger than 2 $\mu$m are effective to the collecting efficiency and the pressure loss. Therefore, the volume of the pores having a diameter larger than 2 $\mu$m should be adjusted corresponding to the use. The volume of pores having a diameter not larger than 2 $\mu$m is preferably not greater than 0.010 cc/g to further improve the collecting time.

The porous ceramic honeycomb filter wherein the volume of pores having a diameter not larger than 2 $\mu$m is not greater than 0.015 cc/g can be produced by adjusting the total amount of fine particles having a grain size not larger than 2 $\mu$m so as to decrease it to an amount not more than 35% of the mixture of the cordierite raw material and the pore forming agent. It is preferable to adjust the total amount of fine particles having a grain size not larger than 2 $\mu$m so as to decrease it to an amount not more than 15% since the volume of the pores having a diameter not larger than 2 $\mu$m can be further decreased.

In a preferred embodiment of the method of producing the porous ceramic honeycomb filter according to the present invention, it is preferable that the amount of the fine particles of silica having a grain size not larger than 2 $\mu$m is not more than 20% of the total amount of particles of silica, the amount of the fine particles of alumina having a grain size not larger not more than 70% of the total amount of than 2 $\mu$m is not more than 20% of the particles of alumina, the amount of the fine particles of kaolin having a grain size not larger than 2 μm is not more than 60% of the total amount of particles of kaolin, and the amount of the fine particles of the pore forming agent is not more than 10% of the total amount of particles of the pore forming agent.

These and other objects, features and advantages of the invention will be appreciated upon reading the following description of the invention when taken in conjunction with the attached drawings; some modifications, variations and changes of the same can be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1A:
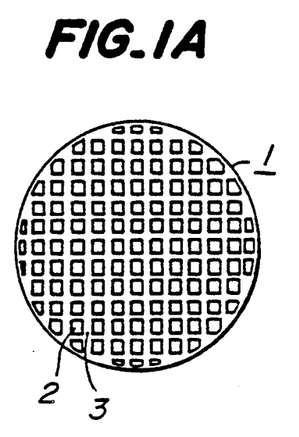
FIGS. 1A and 1B are a front elevational view and a side elevational view, respectively, with a part being broken away of an embodiment of the porous ceramic honeycomb structural body.
Figure 1B:
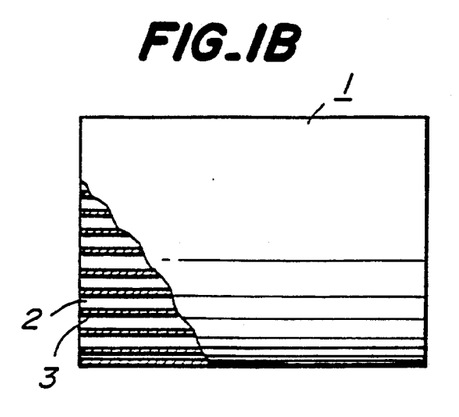
Figure 2A:
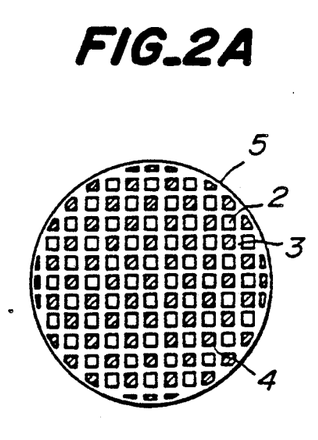
FIGS. 2A and 2B are a front elevational view and a side elevational view, respectively, with a part being broken away of an embodiment of the porous ceramic honeycomb filter.
Figure 2B:
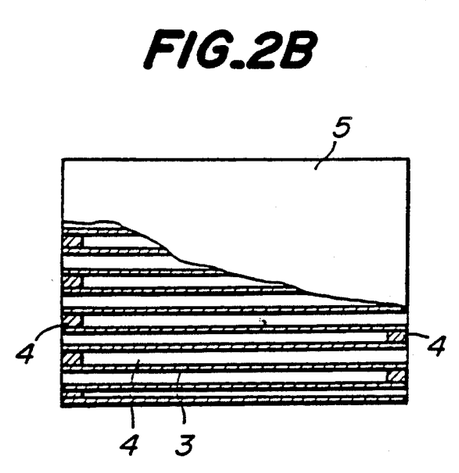

In a first stage of producing the porous ceramic honeycomb filter according to the present invention, a mixture of a composition of cordierite ceramic consisting of 42-56 wt% $SiO_2$, 30-45 wt% $Al_2O_3$ and 12-16 wt% MgO is prepared by using an amount of each of kaolin, calcined kaolin, alumina, aluminum hydroxide, silica, talc, calcined talc and a pore forming agent such as graphite or the like and is adjusted such that the total amount of fine particles having a grain size not larger than 2 μm is not more than 35% of the starting material. In the next stage, a plasticizer and a binder are added to the mixture to make a deformable batch mixture. The thus plasticized batch mixture is shaped by extrusion molding and dried, which is then fired at a temperature in a range of 1350°-1440° C. to obtain a porous ceramic honeycomb structural body 1, as shown in FIGS. 1A and 1B, having channels 2 extending therethrough and porous ceramic partition walls 3. Finally, the porous ceramic honeycomb structural body 1 is sealed by inserting sealing medium 4 into openings at the opposite ends of the structural body to provide a porous ceramic honeycomb filter 5 as shown in FIGS. 2A and 2B.

In the following, an example of the present invention will be explained.

EXAMPLE 1

Starting materials having chemical compositions and grain sizes shown in Table 1 were mixed to prepare batches of mixture Nos. 1-No. 101 shown in Table 2, to each of which methylcellulose 3.5 parts by weight to 100 parts by weight of the batch mixture and additional water were added. Then each batch mixture was kneaded to make an extrudable molding batch body. Each batch body was extruded to produce a cylindrical honeycomb structural body having an outer diameter of 118 mm, a height of 152 mm and a partition wall thickness of 430 μm with the number of cells being 16/cm². Each of the porous ceramic honeycomb structural bodies thus obtained from each batch was dried and then fired in firing conditions shown in Table 2. The properties of the thus fired honeycomb structural bodies, i.e. the coefficient of thermal expansion at a temperature in a range of 40°-800° C., porosity, volume of pores having a diameter not larger than 2 μm and amount of cordierite crystals were determined.

Each porous ceramic honeycomb structural body was sealed by inserting sealants into the openings at the opposite ends of each channel to produce a porous ceramic honeycomb filter. The properties of the filters, i.e., the initial pressure loss and collecting time, were determined. The results of the determination are shown in Table 2.

Figure 3:
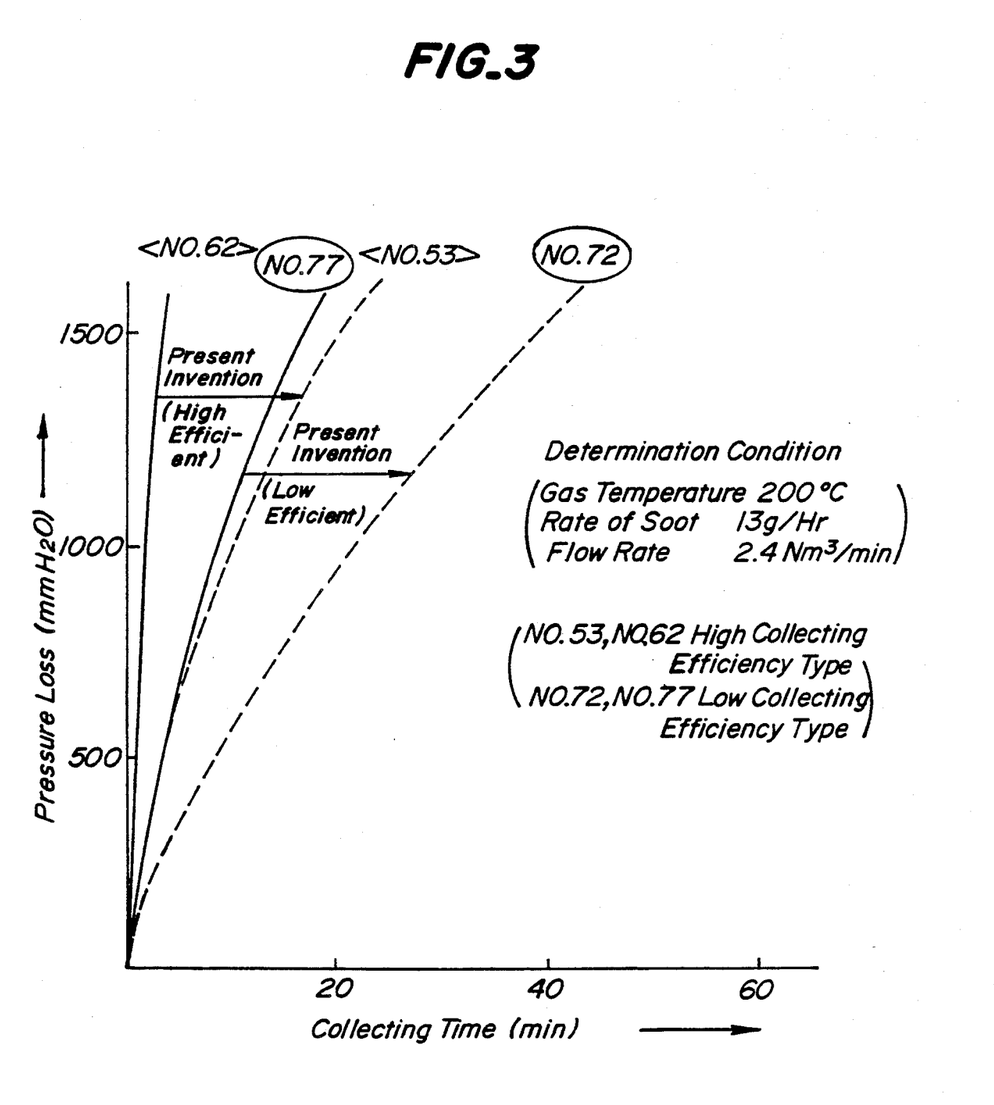
FIG. 3 is a graph showing a relationship between the pressure loss and the collecting time.
Figure 4:
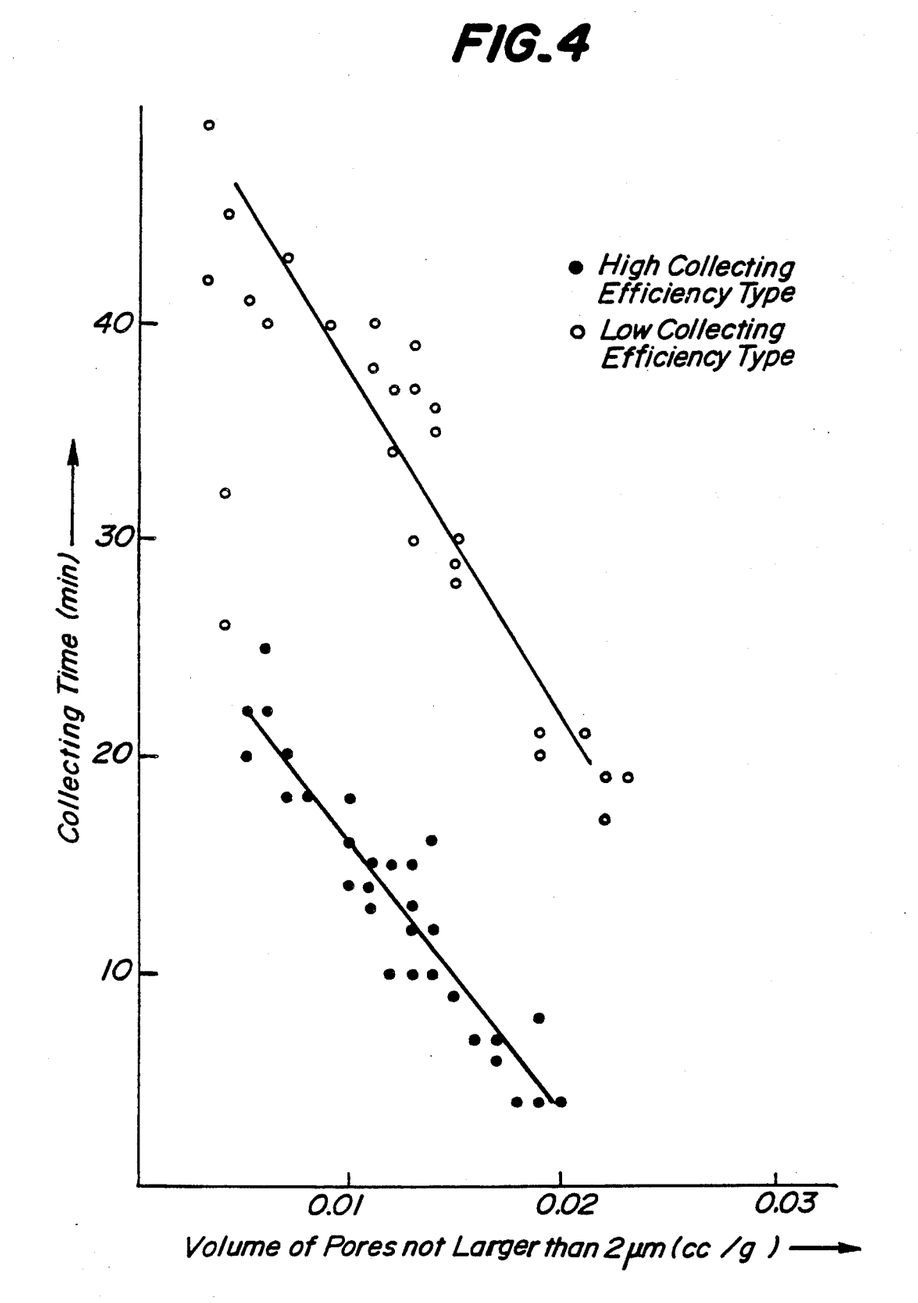
FIG. 4 is a graph showing a relationship between the volume of pores having a diameter not larger than 2 μm and the collecting time.

Furthermore, the relationship between the total volume of pores having a diameter not larger than 2 μm and the collecting time is shown in FIG. 3 and an effect of improving the collecting time is shown in FIG. 4.

TABLE 1

|   | Amount of particles of not larger than 2μ (wt %) | Ig · loss | $SiO_2$ | $Al_2O_3$ | MgO | $TiO_2$ | $Fe_2O_3$ | CaO + $Na_2O$ + $K_2O$ |
|---|---|---|---|---|---|---|---|---|
| Talc A | 2 | 5.1 | 59.9 | 1.5 | 30.9 | — | 1.0 | 0.5 |
| Talc B | 1 | 5.7 | 60.9 | 1.2 | 30.5 | — | 1.1 | 0.6 |
| Calcined talc A | 2 | 0.4 | 64.1 | 1.3 | 33.0 | 0.1 | 0.1 | 0.1 |
| Kaolin A | 12 | 13.9 | 45.5 | 38.8 | — | 0.8 | 0.3 | 0.2 |
| Kaolin B | 70 | 13.9 | 45.7 | 38.7 | — | 0.8 | 0.3 | 0.2 |
| Kaolin C | 90 | 13.9 | 45.5 | 38.8 | — | 1.0 | 0.4 | 0.2 |
| Calcined kaolin A | 50 | 0.1 | 53.1 | 45.1 | — | 0.9 | 0.4 | 0.2 |
| Alumina A | 1 | 0.3 | — | 99.2 | — | — | — | 0.35 |
| Alumina B | 70 | 0.2 | — | 99.5 | — | — | — | 0.12 |
| Alumina C | 90 | 0.2 | — | 99.7 | — | — | — | 0.10 |
| Aluminum hydroxide A | 65 | 34.5 | — | 65.0 | — | — | — | 0.2 |
| Silica A | 2 | 0.1 | 99.7 | 0.1 | — | — | — | — |
| Silica B | 20 | 0.1 | 99.7 | 0.1 | — | — | — | — |
| Silica C | 50 | 0.1 | 99.7 | 0.1 | — | — | — | — |
| Pore forming agent A | 10 | 99.7 | — | — | — | — | 0.2 | — |
| Pore forming agent B | 3 | 99.7 | — | — | — | — | 0.1 | — |
| Pore forming agent C | 20 | 99.5 | — | — | — | — | 0.3 | — |

Note
*Measurement for particle size is carried out by X-ray sedimentation method with use of sedigraph manufactured by Micromelitics Co.

TABLE 2

| Run No. | Talc (amount of particles of not larger than 2 μm, wt %) | Calcined talc (amount of particles of not larger than 2 μm, wt %) | Kaolin (amount of particles of not larger than 2 μm, wt %) | Calcined kaolin (amount of particles of not larger than 2 μm, wt %) | Alumina (amount of particles of not larger than 2 μm, wt %) | Aluminum hydroxide (amount of particles of not larger than 2 μm, wt %) | Silica (amount of particles of not larger than 2 μm, wt %) | Pore forming agent (Extra addition by wt %) (amount of particles of not larger than 2 μm, wt %) | Amount of particles of not larger than 2 μm in a batch mixture (wt %) |
|---|---|---|---|---|---|---|---|---|---|
| 1 | 40.0 (2) | | 25.5 (12) | 20.8 (50) | 13.7 (1) | | | 20.0 (3) | 13 |
| 2 | 40.0 (2) | | 25.5 (70) | 20.8 (50) | 13.7 (1) | | | 20.0 (3) | 25 |
| 3 | 40.0 (2) | | 25.5 (90) | 20.8 (50) | 13.7 (1) | | | 20.0 (3) | 29 |
| 4 | 40.0 (2) | | 25.5 (12) | 20.8 (50) | 13.7 (70) | | | 20.0 (3) | 20 |
| 5 | 40.0 (2) | | 25.5 (12) | 20.8 (50) | 13.7 (90) | | | 20.0 (3) | 23 |
| 6 | 40.0 (2) | | 25.5 (70) | 20.8 (50) | 13.7 (70) | | | 20.0 (3) | 33 |
| 7 | 40.0 (2) | | 25.5 (70) | 20.8 (50) | 13.7 (90) | | | 20.0 (3) | 35 |
| 8 | 40.0 (2) | | 25.5 (90) | 20.8 (50) | 13.7 (70) | | | 20.0 (3) | 37 |
| 9 | 40.0 (2) | | 25.5 (90) | 20.8 (50) | 13.7 (90) | | | 20.0 (3) | 39 |
| 10 | 40.0 (2) | | 25.5 (12) | 20.8 (50) | 13.7 (1) | | | 20.0 (10) | 14 |
| 11 | 40.0 (2) | | 25.5 (12) | 20.8 (50) | 13.7 (1) | | | 20.0 (20) | 15 |
| 12 | 40.0 (2) | | 25.5 (70) | 20.8 (50) | 13.7 (1) | | | 20.0 (10) | 26 |
| 13 | 40.0 (2) | | 25. (70) | 20.8 (50) | 13.7 (1) | | | 20.0 (20) | 28 |
| 14 | 40.0 (2) | | 25.5 (12) | 20.8 (50) | 13.7 (70) | | | 20.0 (10) | 22 |
| 15 | 40.0 (2) | | 25.5 (12) | 20.8 (50) | 13.7 (70) | | | 20.0 (20) | 23 |
| 16 | 40.0 (2) | | 25.5 (70) | 20.8 (50) | 13.7 (70) | | | 20.0 (10) | 34 |
| 17 | 40.0 (2) | | 25.5 (70) | 20.8 (50) | 13.7 (70) | | | 20.0 (20) | 36 |
| 18 | 40.0 (2) | | 25.5 (12) | 20.8 (50) | 13.7 (1) | | | 10.0 (3) | 13 |
| 19 | 40.0 (2) | | 25.5 (12) | 20.8 (50) | 13.7 (1) | | | 30.0 (3) | 12 |
| 20 | 40.0 (2) | | 25.5 (12) | 20.8 (50) | 13.7 (1) | | | 35.0 (3) | 11 |
| 21 | 39.1 (2) | | 29.1 (12) | 16.0 (50) | 9.0 (1) | 6.8 (65) | | 20.0 (3) | 14 |
| 22 | 39.1 (2) | | 29.1 (70) | 16.0 (50) | 9.0 (1) | 6.8 (65) | | 20.0 (3) | 29 |
| 23 | 39.1 (2) | | 29.1 (90) | 16.0 (50) | 9.0 (1) | 6.8 (65) | | 20.0 (3) | 33 |
| 24 | 39.1 (2) | | 29.1 (12) | 16.0 (50) | 9.0 (70) | 6.8 (65) | | 20.0 (3) | 20 |
| 25 | 39.1 (2) | | 29.1 (12) | 16.0 (50) | 9.0 (90) | 6.8 (65) | | 20.0 (3) | 21 |
| 26 | 39.1 (2) | | 29.1 (70) | 16.0 (50) | 9.0 (70) | 6.8 (65) | | 20.0 (3) | 34 |
| 27 | 29.2 (2) | 10.0 (2) | 30.1 (12) | 16.0 (50) | 14.7 (1) | | | 20.0 (3) | 11 |
| 28 | 29.2 (2) | 10.0 (2) | 30.1 (70) | 16.0 (50) | 14.7 (70) | | | 20.0 (3) | 34 |
| 29 | 29.2 (2) | 10.0 (2) | 30.1 (90) | 16.0 (50) | 14.7 (70) | | | 20.0 (3) | 39 |
| 30 | 39.5 (2) | | 14.0 (12) | 9.5 (50) | 12.5 (1) | 14.5 (65) | 10.0 (2) | 20.0 (3) | 15 |
| 31 | 39.5 (2) | | 14.0 (70) | 9.5 (50) | 12.5 (1) | 14.5 (65) | 10.0 (2) | 20.0 (3) | 21 |
| 32 | 39.5 (2) | | 14.0 (90) | 9.5 (50) | 12.5 (1) | 14.5 (65) | 10.0 (2) | 20.0 (3) | 24 |
| 33 | 39.5 (2) | | 14.0 (12) | 9.5 (50) | 12.5 (70) | 14.5 (65) | 10.0 (2) | 20.0 (3) | 22 |
| 34 | 39.5 (2) | | 14.0 (12) | 9.5 (50) | 12.5 (90) | 14.5 (65) | 10.0 (2) | 20.0 (3) | 24 |
| 35 | 39.5 (2) | | 14.0 (12) | 9.5 (50) | 12.5 (1) | 14.5 (65) | 10.0 (20) | 20.0 (3) | 16 |
| 36 | 39.5 (2) | | 14.0 (12) | 9.5 (50) | 12.5 (1) | 14.5 (65) | 10.0 (50) | 20.0 (3) | 19 |
| 37 | 39.5 (2) | | 14.0 (70) | 9.5 (50) | 12.5 (70) | 14.5 (65) | 10.0 (2) | 20.0 (3) | 29 |
| 38 | 39.5 (2) | | 14.0 (70) | 9.5 (50) | 12.5 (70) | 14.5 (65) | 10.0 (20) | 20.0 (3) | 30 |
| 39 | 39.5 (2) | | 14.0 (70) | 9.5 (50) | 12.5 (70) | 14.5 (65) | 10.0 (50) | 20.0 (3) | 33 |
| 40 | 39.5 (2) | | 14.0 (90) | 9.5 (50) | 12.5 (70) | 14.5 (65) | 10.0 (2) | 20.0 (3) | 31 |
| 41 | 39.5 (2) | | 14.0 (90) | 9.5 (50) | 12.5 (70) | 14.5 (65) | 10.0 (20) | 20.0 (3) | 32 |
| 42 | 39.5 (2) | | 14.0 (90) | 9.5 (50) | 12.5 (70) | 14.5 (65) | 10.0 (50) | 20.0 (3) | 35 |
| 43 | 39.5 (2) | | 14.0 (70) | 9.5 (50) | 12.5 (90) | 14.5 (65) | 10.0 (2) | 20.0 (3) | 31 |
| 44 | 39.5 (2) | | 14.0 (70) | 9.5 (50) | 12.5 (90) | 14.5 (65) | 10.0 (20) | 20.0 (3) | 32 |
| 45 | 39.5 (2) | | 14.0 (70) | 9.5 (50) | 12.5 (90) | 14.5 (65) | 10.0 (50) | 20.0 (3) | 35 |
| 46 | 39.5 (2) | | 14.0 (90) | 9.5 (50) | 12.5 (90) | 14.5 (65) | 10.0 (2) | 20.0 (3) | 33 |
| 47 | 39.5 (2) | | 14.0 (90) | 9.5 (50) | 12.5 (90) | 14.5 (65) | 10.0 (20) | 20.0 (3) | 35 |
| 48 | 39.5 (2) | | 14.0 (90) | 9.5 (50) | 12.5 (90) | 14.5 (65) | 10.0 (50) | 20.0 (3) | 37 |
| 49 | 39.5 (2) | | 14.0 (90) | 9.5 (50) | 12.5 (90) | 14.5 (65) | 10.0 (10) | 20.0 (20) | 36 |
| 50 | 39.5 (2) | | 14.0 (90) | 9.5 (50) | 12.5 (90) | 14.5 (65) | 10.0 (20) | 20.0 (20) | 37 |
| 51 | 39.5 (2) | | 14.0 (70) | 9.5 (50) | 12.5 (70) | 14.5 (65) | 10.0 (10) | 10.0 (20) | 33 |
| 52 | 39.5 (2) | | 14.0 (70) | 9.5 (50) | 12.5 (70) | 14.5 (65) | 10.0 (10) | 30.0 (20) | 30 |
| 53 | 29.0 (2) | 10.0 (2) | 16.0 (12) | | 17.5 (1) | 12.5 (65) | 15.0 (2) | 20.0 (3) | 10 |
| 54 | 29.0 (2) | 10.0 (2) | 16.0 (70) | | 17.5 (1) | 12.5 (65) | 15.0 (2) | 20.0 (3) | 28 |
| 55 | 29.0 (2) | 10.0 (2) | 16.0 (90) | | 17.5 (1) | 12.5 (65) | 15.0 (2) | 20.0 (3) | 30 |
| 56 | 29.0 (2) | 10.0 (2) | 16.0 (70) | | 17.5 (90) | 12.5 (65) | 15.0 (2) | 20.0 (3) | 31 |
| 57 | 29.0 (2) | 10.0 (2) | 16.0 (90) | | 17.5 (90) | 12.5 (65) | 15.0 (2) | 20.0 (3) | 33 |
| 58 | 29.0 (2) | 10.0 (2) | 16.0 (90) | | 17.5 (90) | 12.5 (65) | 15.0 (20) | 20.0 (3) | 35 |
| 59 | 29.0 (2) | 10.0 (2) | 16.0 (90) | | 17.5 (90) | 12.5 (65) | 15.0 (50) | 20.0 (3) | 39 |
| 60 | 29.0 (2) | 10.0 (2) | 16.0 (90) | | 17.5 (90) | 12.5 (65) | 15.0 (2) | 20.0 (10) | 35 |
| 61 | 29.0 (2) | 10.0 (2) | 16.0 (90) | | 17.5 (90) | 12.5 (65) | 15.0 (2) | 20.0 (20) | 36 |
| 62 | 29.0 (2) | 10.0 (2) | 16.0 (90) | | 17.5 (90) | 12.5 (65) | 15.0 (50) | 20.0 (20) | 42 |
| 63 | 40.0 (1) | | 25.5 (12) | 20.8 (50) | 13.7 (1) | | | 20.0 (3) | 12 |
| 64 | 40.0 (1) | | 25.5 (70) | 20.8 (50) | 13.7 (1) | | | 20.0 (3) | 24 |
| 65 | 40.0 (1) | | 25.5 (90) | 20.8 (50) | 13.7 (1) | | | 20.0 (3) | 29 |
| 66 | 40.0 (1) | | 25.5 (12) | 20.8 (50) | 13.7 (70) | | | 20.0 (3) | 20 |
| 67 | 40.0 (1) | | 25.5 (12) | 20.8 (50) | 13.7 (90) | | | 20.0 (3) | 22 |
| 68 | 40.0 (1) | | 25.5 (70) | 20.8 (50) | 13.7 (70) | | | 20.0 (3) | 32 |
| 69 | 40.0 (1) | | 25.5 (70) | 20.8 (50) | 13.7 (90) | | | 20.0 (3) | 35 |
| 70 | 40.0 (1) | | 25.5 (90) | 20.8 (50) | 13.7 (70) | | | 20.0 (3) | 37 |
| 71 | 40.0 (1) | | 25.5 (90) | 20.8 (50) | 13.7 (90) | | | 20.0 (3) | 39 |
| 72 | 40.0 (1) | | 25.5 (12) | 20.8 (50) | 13.7 (1) | | | 20.0 (10) | 13 |
| 73 | 40.0 (1) | | 25.5 (12) | 20.8 (50) | 13.7 (1) | | | 20.0 (20) | 15 |

TABLE 2-continued

| 74 | 40.0 (1) | | 25.5 (70) | 20.8 (50) | 13.7 (70) | | | 20.0 (10) | 34 |
|---|---|---|---|---|---|---|---|---|---|
| 75 | 40.0 (1) | | 25.5 (70) | 20.8 (50) | 13.7 (70) | | | 20.0 (20) | 35 |
| 76 | 40.0 (1) | | 25.5 (90) | 20.8 (50) | 13.7 (90) | | | 20.0 (10) | 40 |
| 77 | 40.0 (1) | | 25.5 (90) | 20.8 (50) | 13.7 (90) | | | 20.0 (20) | 42 |
| 78 | 40.0 (1) | | 25.5 (12) | 20.8 (50) | 13.7 (1) | | | 10.0 (3) | 13 |
| 79 | 40.0 (1) | | 25.5 (12) | 20.8 (50) | 13.7 (1) | | | 30.0 (3) | 11 |
| 80 | 40.0 (1) | | 25.5 (12) | 20.8 (50) | 13.7 (1) | | | 35.0 (3) | 11 |
| 81 | 29.0 (1) | 10.0 (2) | 16.0 (12) | | 17.5 (1) | 12.5 (65) | 15.0 (2) | 20.0 (3) | 10 |
| 82 | 29.0 (1) | 10.0 (2) | 16.0 (70) | | 17.5 (1) | 12.5 (65) | 15.0 (2) | 20.0 (3) | 17 |
| 83 | 29.0 (1) | 10.0 (2) | 16.0 (90) | | 17.5 (1) | 12.5 (65) | 15.0 (2) | 20.0 (3) | 20 |
| 84 | 29.0 (1) | 10.0 (2) | 16.0 (12) | | 17.5 (70) | 12.5 (65) | 15.0 (2) | 20.0 (3) | 20 |
| 85 | 29.0 (1) | 10.0 (2) | 16.0 (12) | | 17.5 (90) | 12.5 (65) | 15.0 (2) | 20.0 (3) | 23 |
| 86 | 29.0 (1) | 10.0 (2) | 16.0 (12) | | 17.5 (1) | 12.5 (65) | 15.0 (20) | 20.0 (3) | 12 |
| 87 | 29.0 (1) | 10.0 (2) | 16.0 (12) | | 17.5 (1) | 12.5 (65) | 15.0 (50) | 20.0 (3) | 16 |
| 88 | 29.0 (1) | 10.0 (2) | 16.0 (70) | | 17.5 (70) | 12.5 (65) | 15.0 (2) | 20.0 (3) | 27 |
| 89 | 29.0 (1) | 10.0 (2) | 16.0 (70) | | 17.5 (70) | 12.5 (65) | 15.0 (20) | 20.0 (3) | 30 |
| 90 | 29.0 (1) | 10.0 (2) | 16.0 (70) | | 17.5 (70) | 12.5 (65) | 15.0 (50) | 20.0 (3) | 33 |
| 91 | 29.0 (1) | 10.0 (2) | 16.0 (90) | | 17.5 (90) | 12.5 (65) | 15.0 (2) | 20.0 (3) | 33 |
| 92 | 29.0 (1) | 10.0 (2) | 16.0 (90) | | 17.5 (90) | 12.5 (65) | 15.0 (20) | 20.0 (3) | 35 |
| 93 | 29.0 (1) | 10.0 (2) | 16.0 (90) | | 17.5 (90) | 12.5 (65) | 15.0 (50) | 20.0 (3) | 39 |
| 94 | 29.0 (1) | 10.0 (2) | 16.0 (12) | | 17.5 (1) | 12.5 (65) | 15.0 (2) | 10.0 (3) | 10 |
| 95 | 29.0 (1) | 10.0 (2) | 16.0 (12) | | 17.5 (1) | 12.5 (65) | 15.0 (2) | 30.0 (3) | 9 |
| 96 | 29.0 (1) | 10.0 (2) | 16.0 (12) | | 17.5 (1) | 12.5 (65) | 15.0 (2) | 20.0 (10) | 11 |
| 97 | 29.0 (1) | 10.0 (2) | 16.0 (12) | | 17.5 (1) | 12.5 (65) | 15.0 (2) | 20.0 (20) | 13 |
| 98 | 29.0 (1) | 10.0 (2) | 16.0 (70) | | 17.5 (70) | 12.5 (65) | 15.0 (20) | 20.0 (10) | 31 |
| 99 | 29.0 (1) | 10.0 (2) | 16.0 (70) | | 17.5 (70) | 12.5 (65) | 15.0 (20) | 20.0 (20) | 33 |
| 100 | 29.0 (1) | 10.0 (2) | 16.0 (90) | | 17.5 (90) | 12.5 (65) | 15.0 (50) | 20.0 (10) | 40 |
| 101 | 29.0 (1) | 10.0 (2) | 16.0 (90) | | 17.5 (90) | 12.5 (65) | 15.0 (50) | 20.0 (20) | 42 |

| | Firing Conditions | | | Properties of Fired Body | | | | Properties of Filter | | |
|---|---|---|---|---|---|---|---|---|---|---|
| Run No. | Rate of[*1] heating (°C./hr) | Maximum temperature (°C.) | Holding time (hr) | Coefficient of thermal expansion ($\times 10^{-6}$/°C.) | Porosity[*2] (%) | Volume[*3] of pores of not larger than 2 μm (cc/g) | Amount[*4] of cordierite crystals (wt %) | Initial[*5] pressure loss (mmH$_2$O) | Collect-[*6] ing time (min) | N |
| 1 | 40 | 1410 | 6 | 0.9 | 50 | 0.005 | 93 | 120 | 20 | Present invention |
| 2 | " | " | " | 0.9 | 48 | 0.011 | 93 | 132 | 15 | Present invention |
| 3 | " | " | " | 0.8 | 47 | 0.014 | 93 | 137 | 10 | Present invention |
| 4 | " | " | " | 0.9 | 48 | 0.010 | 93 | 131 | 16 | Present invention |
| 5 | " | " | " | 0.8 | 47 | 0.013 | 93 | 138 | 15 | Present invention |
| 6 | " | " | " | 0.8 | 45 | 0.014 | 93 | 140 | 11 | Present invention |
| 7 | " | " | " | 0.8 | 40 | 0.015 | 93 | 142 | 9 | Present invention |
| 8 | " | " | " | 0.8 | 44 | 0.017 | 93 | 133 | 7 | Reference |
| 9 | " | " | " | 0.8 | 40 | 0.020 | 93 | 140 | 4 | " |
| 10 | " | " | " | 0.9 | 50 | 0.007 | 93 | 130 | 20 | Present invention |
| 11 | " | " | " | 0.9 | 49 | 0.010 | 93 | 132 | 18 | Present invention |
| 12 | " | " | " | 0.8 | 45 | 0.013 | 93 | 137 | 12 | Present invention |
| 13 | " | " | " | 0.8 | 45 | 0.013 | 93 | 140 | 10 | Present invention |
| 14 | 40 | 1410 | 6 | 0.8 | 46 | 0.011 | 93 | 135 | 13 | Present invention |
| 15 | " | " | " | 0.8 | 46 | 0.012 | 93 | 137 | 10 | Present invention |
| 16 | " | " | " | 0.8 | 45 | 0.014 | 93 | 138 | 10 | Present invention |
| 17 | " | " | " | 0.8 | 44 | 0.017 | 93 | 138 | 6 | Reference |
| 18 | " | " | " | 0.8 | 37 | 0.004 | 93 | 160 | 10 | " |
| 19 | " | " | " | 0.8 | 53 | 0.005 | 93 | 124 | 22 | Present invention |
| 20 | " | " | " | 0.8 | 55 | 0.006 | 93 | 119 | 25 | Present invention |
| 21 | 50 | 1420 | 4 | 0.8 | 49 | 0.008 | 92 | 130 | 18 | Present invention |
| 22 | " | " | " | 0.8 | 46 | 0.013 | 92 | 137 | 13 | Present invention |
| 23 | " | " | " | 0.8 | 45 | 0.014 | 93 | 140 | 10 | Present invention |
| 24 | " | " | " | 0.8 | 47 | 0.012 | 93 | 132 | 15 | Present invention |
| 25 | " | " | " | 0.8 | 45 | 0.014 | 93 | 135 | 12 | Present invention |
| 26 | " | " | " | 0.8 | 44 | 0.015 | 93 | 142 | 9 | Present |

TABLE 2-continued

| | | | | | | | | | | |
|---|---|---|---|---|---|---|---|---|---|---|
| 27 | 45 | 1410 | 4 | 0.9 | 52 | 0.006 | 92 | 125 | 22 | Present invention |
| 28 | " | " | " | 0.8 | 50 | 0.014 | 92 | 137 | 16 | Present invention |
| 29 | " | " | " | 0.8 | 49 | 0.019 | 92 | 132 | 8 | Reference |
| 30 | 40 | 1410 | 5 | 0.8 | 54 | 0.007 | 92 | 130 | 18 | Present invention |
| 31 | " | " | " | 0.7 | 52 | 0.012 | 92 | 137 | 15 | Present invention |
| 32 | " | " | " | 0.7 | 51 | 0.014 | 92 | 142 | 12 | Present invention |
| 33 | " | " | " | 0.7 | 50 | 0.011 | 93 | 135 | 15 | Present invention |
| 34 | " | " | " | 0.7 | 49 | 0.013 | 93 | 137 | 13 | Present invention |
| 35 | " | " | " | 0.8 | 52 | 0.010 | 93 | 134 | 14 | Present invention |
| 36 | " | " | " | 0.8 | 53 | 0.011 | 93 | 140 | 13 | Present invention |
| 37 | " | " | " | 0.7 | 51 | 0.013 | 93 | 142 | 12 | Present invention |
| 38 | " | " | " | 0.7 | 50 | 0.012 | 93 | 145 | 12 | Present invention |
| 39 | " | " | " | 0.7 | 48 | 0.014 | 93 | 146 | 10 | Present invention |
| 40 | " | " | " | 0.7 | 48 | 0.015 | 93 | 145 | 10 | Present invention |
| 41 | 40 | 1410 | 5 | 0.7 | 47 | 0.015 | 93 | 143 | 9 | Present invention |
| 42 | " | " | " | 0.7 | 46 | 0.014 | 93 | 145 | 11 | Present invention |
| 43 | " | " | " | 0.7 | 48 | 0.013 | 93 | 138 | 12 | Present invention |
| 44 | " | " | " | 0.7 | 47 | 0.014 | 93 | 142 | 12 | Present invention |
| 45 | " | " | " | 0.7 | 47 | 0.015 | 93 | 140 | 10 | Present invention |
| 46 | " | " | " | 0.7 | 46 | 0.014 | 93 | 152 | 9 | Present invention |
| 47 | " | " | " | 0.7 | 48 | 0.014 | 93 | 135 | 13 | Present invention |
| 48 | " | " | " | 0.7 | 47 | 0.016 | 93 | 135 | 7 | Reference |
| 49 | " | " | " | 0.7 | 47 | 0.016 | 93 | 137 | 7 | " |
| 50 | " | " | " | 0.7 | 47 | 0.018 | 93 | 131 | 4 | " |
| 51 | " | " | " | 0.7 | 40 | 0.013 | 92 | 135 | 11 | Present invention |
| 52 | " | " | " | 0.7 | 55 | 0.012 | 93 | 125 | 18 | Present invention |
| 53 | 60 | 1420 | 4 | 0.7 | 52 | 0.004 | 93 | 120 | 23 | Present invention |
| 54 | " | " | " | 0.7 | 50 | 0.012 | 93 | 130 | 17 | Present invention |
| 55 | " | " | " | 0.6 | 49 | 0.013 | 93 | 135 | 13 | Present invention |
| 56 | " | " | " | 0.6 | 49 | 0.014 | 93 | 134 | 12 | Present invention |
| 57 | " | " | " | 0.6 | 49 | 0.015 | 93 | 138 | 10 | Present invention |
| 58 | " | " | " | 0.6 | 49 | 0.014 | 93 | 139 | 11 | Present invention |
| 59 | " | " | " | 0.6 | 48 | 0.016 | 93 | 137 | 7 | Reference |
| 60 | " | " | " | 0.6 | 48 | 0.015 | 93 | 138 | 11 | Present invention |
| 61 | " | " | " | 0.6 | 48 | 0.017 | 93 | 139 | 8 | Reference |
| 62 | " | " | " | 0.6 | 49 | 0.019 | 93 | 135 | 4 | " |
| 63 | 40 | 1410 | 6 | 1.0 | 50 | 0.003 | 92 | 89 | 42 | Present invention |
| 64 | " | " | " | 1.0 | 49 | 0.012 | 92 | 95 | 37 | Present invention |
| 65 | 40 | 1410 | 6 | 0.9 | 47 | 0.014 | 92 | 99 | 35 | Present invention |
| 66 | " | " | " | 1.0 | 48 | 0.011 | 92 | 94 | 38 | Present invention |
| 67 | " | " | " | 0.9 | 46 | 0.012 | 92 | 97 | 34 | Present invention |
| 68 | " | " | " | 0.9 | 47 | 0.013 | 92 | 105 | 30 | Present invention |
| 69 | " | " | " | 0.9 | 45 | 0.015 | 92 | 110 | 30 | Present invention |
| 70 | " | " | " | 0.9 | 45 | 0.019 | 92 | 112 | 20 | Reference |
| 71 | " | " | " | 0.9 | 44 | 0.022 | 92 | 109 | 17 | " |

TABLE 2-continued

| | | | | | | | | | | |
|---|---|---|---|---|---|---|---|---|---|---|
| 72 | " | " | " | 1.0 | 49 | 0.007 | 92 | 88 | 43 | Present invention |
| 73 | " | " | " | 1.0 | 48 | 0.010 | 92 | 90 | 40 | Present invention |
| 74 | " | " | " | 0.9 | 48 | 0.013 | 92 | 107 | 30 | Present invention |
| 75 | " | " | " | 0.9 | 48 | 0.015 | 92 | 110 | 30 | Present invention |
| 76 | " | " | " | 0.9 | 47 | 0.021 | 92 | 105 | 21 | Reference |
| 77 | " | " | " | 0.9 | 47 | 0.022 | 92 | 103 | 19 | " |
| 78 | 40 | 1410 | 6 | 1.0 | 40 | 0.004 | 92 | 110 | 32 | Present invention |
| 79 | " | " | " | 1.0 | 55 | 0.003 | 92 | 75 | 50 | Present invention |
| 80 | " | " | " | 1.0 | 58 | 0.002 | 92 | 65 | 55 | Reference |
| 81 | 60 | 1420 | 4 | 0.8 | 53 | 0.004 | 92 | 85 | 45 | Present invention |
| 82 | 60 | 1420 | 4 | 0.8 | 52 | 0.011 | 93 | 90 | 40 | Present invention |
| 83 | " | " | " | 0.7 | 51 | 0.013 | 92 | 95 | 37 | Present invention |
| 84 | " | " | " | 0.8 | 52 | 0.013 | 92 | 90 | 39 | Present invention |
| 85 | " | " | " | 0.7 | 51 | 0.014 | 92 | 97 | 35 | Present invention |
| 86 | " | " | " | 0.9 | 53 | 0.007 | 92 | 93 | 42 | Present invention |
| 87 | " | " | " | 0.9 | 52 | 0.013 | 92 | 105 | 31 | Present invention |
| 88 | " | " | " | 0.8 | 51 | 0.014 | 92 | 110 | 30 | Present invention |
| 89 | " | " | " | 0.8 | 51 | 0.014 | 92 | 110 | 30 | Present invention |
| 90 | " | " | " | 0.8 | 50 | 0.015 | 92 | 113 | 29 | Present invention |
| 91 | " | " | " | 0.7 | 48 | 0.015 | 92 | 115 | 28 | Present invention |
| 92 | 60 | 1420 | 4 | 0.7 | 48 | 0.015 | 92 | 117 | 28 | Present invention |
| 93 | " | " | " | 0.7 | 47 | 0.019 | 92 | 110 | 21 | Reference |
| 94 | " | " | " | 0.9 | 40 | 0.003 | 92 | 105 | 25 | Present invention |
| 95 | " | " | " | 1.0 | 54 | 0.003 | 92 | 90 | 47 | Present invention |
| 96 | " | " | " | 1.0 | 49 | 0.005 | 93 | 95 | 41 | Present invention |
| 97 | " | " | " | 1.0 | 49 | 0.006 | 93 | 96 | 40 | Present invention |
| 98 | " | " | " | 0.9 | 48 | 0.013 | 92 | 105 | 35 | Present invention |
| 99 | " | " | " | 0.9 | 48 | 0.014 | 92 | 107 | 33 | Present invention |
| 100 | " | " | " | 0.8 | 48 | 0.019 | 92 | 104 | 25 | Reference |
| 101 | " | " | " | 0.8 | 48 | 0.023 | 92 | 103 | 20 | " |

*[1]1100~1350° C. Average heating rate
*[2]Mercury forcing method. Conversion value of volume of pores (for real specific gravity of cordierite: 2.52)
*[3]Mercury forcing method.
*[4]Amount measured by X-ray diffractometer with use of ZnO as internal standard
*[5]Room temperature (20° C.) 58φ 1 Nm³/min
*[6]Time spent until a pressure loss reaches to 1600 mmH₂O when a gas contained soots with a rate of 13 g/hr 2.4 Nm³/min at a temperature of 200° C.

In Table 2, the run Nos. 1–62 are of the high collecting efficiency type and the run Nos. 63–101 are of the low collecting efficiency type. It will be understood from the results shown in Table 2 that the collecting time can be more prolonged in the case of the volume of pores having a diameter not larger than 2 μm being not more than 0.015 cc/g, than the case of the total volume of that being more than 0.015 cc/g. If the porosity is less than 40% the initial pressure loss becomes too large to improve the collecting time, while if the porosity is more than 55%, the strength of the honeycomb structural body is decreased.

What is claimed is:

1. A method of producing a porous ceramic honeycomb filter, comprising the steps of:

mixing a cordierite raw material consisting essentially of 42–56 wt% $SiO_2$, 30–45 wt% $Al_2O_3$, and 12–16 wt% MgO as main components, with a pore forming agent;

adjusting a grain size of fine particles of the raw material such that a total amount of particles having a grain size not larger than 2 μm is not more than 35% of the entire wt% of the mixture;

adding a plasticizer and a binder to the adjusted raw material to make a batch mixture;

extrusion molding the batch mixture to produce a ceramic honeycomb filter;

drying the extruded ceramic honeycomb filter; and firing the extruded ceramic honeycomb filter at a firing temperature in a range of 1350°–1440° C.

2. The method of claim 1, wherein the total amount of particles having a grain size not larger than 2 μm in the mixture is not more than 15% of the entire wt% of the mixture.

3. A porous ceramic honeycomb filter produced by the method of claim 1, the ceramic honeycomb filter having a chemical composition consisting essentially of 42-56 wt% $SiO_2$, 30-45 wt% $Al_2O_3$, and 12-16 wt% MgO as main components, and cordierite as a main component of a crystalline phase, wherein the ceramic honeycomb filter has a porosity of at least 40% but not greater than 55%, and a volume of pores in the ceramic honeycomb filter having a diameter not larger than 2 μm is not greater than 0.015 cc/g.

4. The ceramic honeycomb filter of claim 3, wherein the volume of pores in the ceramic honeycomb filter having a diameter not larger than 2 μm is not greater than 0.010 cc/g.

* * * * *